US012749149B2

(12) United States Patent
Uehara

(10) Patent No.: US 12,749,149 B2
(45) Date of Patent: Sep. 29, 2026

(54) IMAGE PROCESSING APPARATUS FOR ENHANCING DEFINITION OF IMAGE GROUP USING MACHINE LEARNING, CONTROL METHOD THEREOF, AND STORAGE MEDIUM

(71) Applicant: CANON KABUSHIKI KAISHA, Tokyo (JP)

(72) Inventor: Yota Uehara, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 204 days.

(21) Appl. No.: 18/888,310

(22) Filed: Sep. 18, 2024

(65) Prior Publication Data

US 2025/0104189 A1 Mar. 27, 2025

(30) Foreign Application Priority Data

Sep. 26, 2023 (JP) ................................ 2023-163092

(51) Int. Cl.
*G06K 9/00* (2022.01)
*G06T 3/4053* (2024.01)
*G06T 5/50* (2006.01)
*G06T 5/60* (2024.01)

(52) U.S. Cl.
CPC .............. *G06T 3/4053* (2013.01); *G06T 5/50* (2013.01); *G06T 5/60* (2024.01); *G06T 2207/20081* (2013.01)

(58) Field of Classification Search
CPC ........... G06T 3/4053; G06T 5/50; G06T 5/60; G06T 2207/20081; G06T 3/4046
See application file for complete search history.

(56) References Cited

U.S. PATENT DOCUMENTS

2023/0360437 A1* 11/2023 Shin ........................ G06F 3/012
2024/0169479 A1* 5/2024 Wang .................... G06T 3/4007

FOREIGN PATENT DOCUMENTS

CN 111784615 A * 10/2020 ............... G06T 5/60
CN 113344794 A * 9/2021 ............. G06N 3/045
JP 2019087229 A 6/2019
JP 2023057860 A 4/2023

* cited by examiner

*Primary Examiner* — Xin Jia
(74) *Attorney, Agent, or Firm* — Cowan, Liebowitz & Latman, P.C.

(57) ABSTRACT

An image processing apparatus in which super-resolution process for an image to be inferred using a learned model can be executed at a constant inference accuracy without reducing processing efficiency of a learning process. First and second image groups are frame groups of two moving images respectively generated by simultaneously shooting the same subject with different resolutions and frame rates. An image group is collected from the first image group based on an image whose definition is to be enhanced every time the image whose definition is to be enhanced is acquired from the second image group. When the collected image group is suitable as the teacher image group, a first learned model generated using the collected image group is selected as the learned model. Otherwise, a second learned model generated in advance using a previously-collected image group is selected as the learned model.

9 Claims, 10 Drawing Sheets

FIG. 6

DATABASE STRUCTURE

| INDEX | FRAME NO. IN MOVING IMAGE A | FRAME NO. IN MOVING IMAGE B |
| --- | --- | --- |
| 1 | 1 | 2 |
| 2 | 2 | 5 |
| 3 | 3 | 8 |
| ⋮ | ⋮ | ⋮ |
| i-1 | n-1 | m-4 |
| i | n | m-1 |

IMAGE PROCESSING APPARATUS FOR ENHANCING DEFINITION OF IMAGE GROUP USING MACHINE LEARNING, CONTROL METHOD THEREOF, AND STORAGE MEDIUM

BACKGROUND OF THE INVENTION

Field of the Invention

The present invention relates to an image processing apparatus for enhancing the definition of an image group using machine learning, a control method thereof, and a storage medium.

Description of the Related Art

Super-resolution techniques using machine learning are techniques for generating a high-definition image when an image is enlarged and subjected to resolution conversion. Machine learning is used to infer high-frequency components that cannot be compensated by linear interpolation among pixel values. In super-resolution techniques, first, a learning process for a learning model is performed using, as teacher data, an image group G and degraded images obtained by degrading each of the images of the image group G by any method. Specifically, the learning model is trained based on the differences between the pixel value of the original image and the degraded image, and a learned model is generated by updating super-resolution process parameters that the learning model have. When an image H that is short of high-frequency components is input to the learned model thus generated, the high-frequency components are acquired by inference using the learned model. The high-frequency components acquired by the inference are superimposed on the image H to generate a high-definition image.

In general, in a case where a product or a service using a learned model is provided, the process of collecting teacher data and generating the learned model is performed by a developer, and then the generated learned model is provided to a user. Therefore, the content of the image input by the user is unknown at the time when the learning process is performed. Because of this, the developer generates the learned model by preparing many images of various kinds that contain equally diverse image patterns as teacher data, and repeatedly performing the learning process so that inference can be made with equal accuracies for any image to be inferred.

However, in a case where various kinds of images that contain equally diverse image patterns are used as the teacher data, there is very little teacher data having high similarity with the image to be inferred that is designated by the user. If the learned model is generated using such teacher data, a result of learning with images having low similarity with the image to be inferred would be reflected in the inference. For this reason, the effect of this technique is limited to, for example, improving the resolution of the result of inference by emphasizing the edge of the subject. It is difficult for such a learned model to accurately infer high-frequency components such as a fine pattern of a subject, and inference accuracy is not high.

To solve such a problem, an apparatus has been proposed that collects images suitable for learning for each image to be inferred, and executes learning to generate a learned model.

For example, Japanese Laid-Open Patent Publication (kokai) No. 2023-57860 describes an apparatus that is trained using each of the frames of a moving image A with a high resolution and low frame rate and a moving image B with a low resolution and high frame rate recorded for the same scene, and executes a super-resolution process on the moving image B using the generated learned model. Since the teacher data is limited to the same moving image frames as the frames of an inference target, and the image similarity with the inference target increases in this apparatus, the learned model can be expected to have high accuracy. As a result, by inputting the moving image B to the learned model, a moving image C having the resolution of the moving image A and the frame rate of the moving image B can be generated with high accuracy.

However, in an apparatus that "collects teacher images for each image to be inferred and executes learning to generate a learned model" like the one described in Japanese Laid-Open Patent Publication (kokai) No. 2023-57860, it is possible that the collected teacher images are not suitable for learning, the teacher images cannot be collected, or the like. Taking Japanese Laid-Open Patent Publication (kokai) No. 2023-57860 as an example, if a frame among the moving image frames that was captured at the moment a camera flashed is the inference target, its similarity with the preceding and following frames is low, and it may be difficult to collect images (frames) suitable as teacher images from the moving images A and B. In such a case, the result of learning with images having low similarity with the image to be inferred would be reflected in the inference, and inference accuracy would drop significantly.

On the other hand, if "the collected teacher images are not suitable for learning" or "the teacher images cannot be collected", a learned model prepared in advance can be used to suppress a significant decrease in inference accuracy.

Japanese Laid-Open Patent Publication (kokai) No. 2019-87229 describes an apparatus that compares each of the sets of imaging environment information of images used to train a plurality of learned models prepared in advance with imaging environment information of the image to be inferred, and determines the learned model to be used based on a degree of coincidence.

Therefore, the apparatus of Japanese Laid-Open Patent Publication (kokai) No. 2019-87229 can switch the learned model to be used as appropriate according to the image to be inferred.

However, it is difficult to improve the above-described problem by combining Japanese Laid-Open Patent Publication (kokai) No. 2023-57860 and Japanese Laid-Open Patent Publication (kokai) No. 2019-87229 to compare "learned models prepared in advance" with "a learned model generated by training using teacher images collected after determining the inference target", and use the learned model that can be expected to have high inference accuracy. This is because the apparatus of Japanese Laid-Open Patent Publication (kokai) No. 2019-87229 uses the result of comparison of the sets of imaging environment information each associated with a learning model to estimate the inference accuracy, and not the result of comparison of the images themselves, which makes the estimation of the inference accuracy insufficient.

In addition, the apparatus of Japanese Laid-Open Patent Publication (kokai) No. 2019-87229 is configured on the premise that the learned model to be used is determined by comparing a plurality of learning models after learning. Therefore, if the apparatus disclosed in Japanese Laid-Open Patent Publication (kokai) No. 2019-87229 is used in combination with the apparatus disclosed in Japanese Laid-Open Patent Publication (kokai) No. 2023-57860 that "collects teacher images and learns after determining the inference target", it is necessary to train many learning models that are not to be used. This results in a poor processing efficiency.

SUMMARY OF THE INVENTION

The present invention provides an image processing apparatus, a control method, and a storage medium capable of executing super-resolution processing of an image to be inferred using a learned model at a constant inference accuracy without reducing processing efficiency of the learning process.

Accordingly, the present invention provides an image processing apparatus that enhances a definition of a second image group (B) having a frame rate FB and a resolution XB to a resolution XA (>XB) of a first image group (A) having a frame rate FA (<FB) by inference using a learned model, the first and second image groups (A and B) being frame groups of two moving images (A and B) respectively generated by simultaneously shooting the same subject with different resolutions and frame rates, the image processing apparatus comprising one or more controllers configured to function as a learning unit (303) that trains a learning model by using a teacher image group having the resolution XA to generate the learned model, a collection unit (302) that collects an image group (UA) from the first image group (TA) based on an image (By) whose definition is to be enhanced every time the image whose definition is to be enhanced is acquired from the second image group (B), a first selection unit that, when it is determined that the collected image group (UA) is suitable as the teacher image group (YES in S704), generates a first learned model (M) by the learning unit using the collected image group (UA) as the teacher image group, and selects the generated first learned model (M) as the learned model, and a second selection unit that, when it is determined that the collected image group (UA) is not suitable as the teacher image group (NO in S704), selects, as the learned model, a second learned model (MG) generated in advance by the learning unit using a previously-collected image group (K) as the teacher image group.

According to the present invention, the super-resolution process for the image to be inferred using the learned model can be executed at a constant inference accuracy without reducing the processing efficiency of the learning process.

Further features of the present invention will become apparent from the following description of exemplary embodiments with reference to the attached drawings.

BRIEF DESCRIPTION OF THE DRAWINGS

FIG. 6 is a diagram illustrating an example of a data configuration of a teacher data candidate database according to the first embodiment.

DESCRIPTION OF THE EMBODIMENTS

Figure 1:
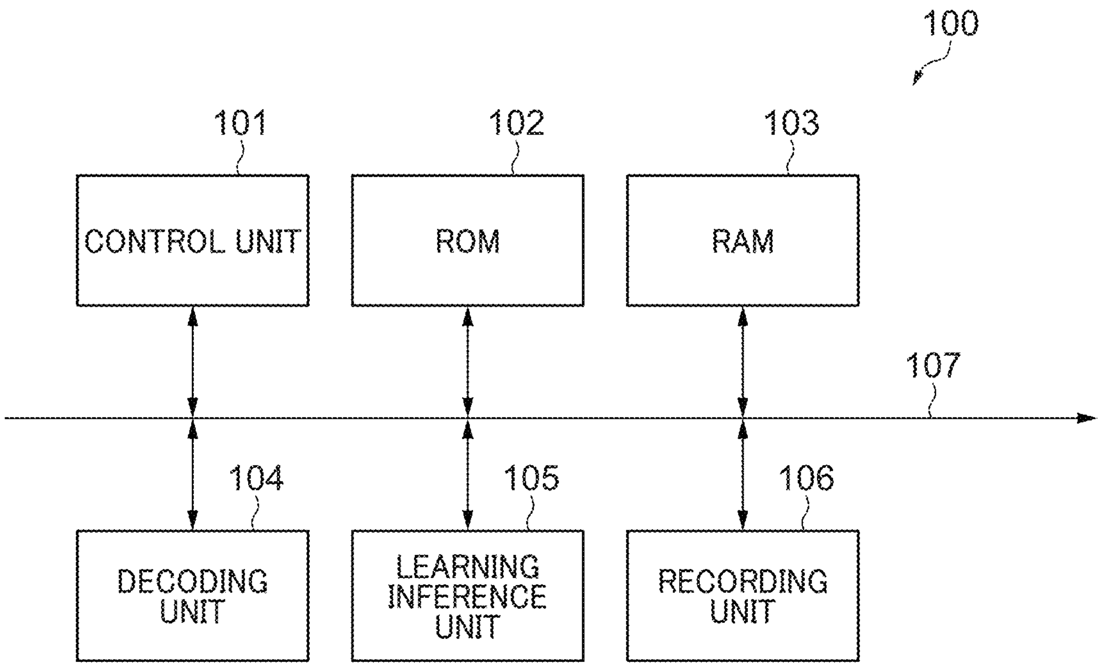
FIG. 1 is a block diagram illustrating a hardware configuration of the image processing apparatus according to a first embodiment.

The present invention will now be described in detail below with reference to the accompanying drawings showing embodiments thereof. It should be noted that the following embodiments do not limit the invention according to the claims. Although a plurality of features are described in each embodiment, the plurality of features are not necessarily all essential to the invention, and the plurality of features may be combined as desired. Further, in the accompanying drawings, the same or similar configurations are denoted by the same reference numerals, and redundant description will be omitted.

In the following, a "learning model" means a machine learning model that has not been trained or not been completely trained prepared in advance, and a "learned model" means a machine learning model after training.

Outline Description of Image Processing Apparatus

A first embodiment of the present invention will be described. Two moving images (moving images A and B in FIG. 4 to be described later) simultaneously captured by the same image pickup apparatus (not illustrated) are input to the image processing apparatus 100 according to the first embodiment as input moving images. A resolution XA/frame rate FA of the moving image A and a resolution XB/frame rate FB of the moving image B satisfy the relationship "XA>XB and FA<FB". The image processing apparatus 100 has a function (high-definition moving image generating function) of generating a learned model by learning using frames of the moving images A and B, and generating a moving image C with the resolution XA/frame rate FB from the moving image B by inference using the learned model. The resolution of various kinds of teacher data (teacher image group) used for this learning is the resolution XA (details will be described later).

Outline Description of Configuration of Image Processing Apparatus

FIG. 1 is a block diagram illustrating a hardware configuration of the image processing apparatus 100 according to the first embodiment.

In FIG. 1, the image processing apparatus 100 includes a control unit 101, a ROM 102, a RAM 103, a decoding unit 104, a learning inference unit 105, a recording unit 106, and a bus 107.

The control unit 101 is an arithmetic device such as a CPU, and realizes various functions by deploying a program stored in the ROM 102 into a work area of the RAM 103 and executing the program. The control unit 101 can function as, for example, functional blocks of an analysis unit 201 and a decoded moving image generation unit 202 described later (FIG. 2), and a candidate acquisition unit 301 and a teacher data extraction unit 302 described later (FIG. 3).

The ROM 102 stores a control program executed by the control unit 101. The RAM 103 is used for a work memory for the control unit 101 to execute a program, a temporary storage area for various data, and the like.

The decoding unit 104 decodes a moving image or image data compressed by an encoding format defined by Moving Picture Experts Group (MPEG) into uncompressed data.

The learning inference unit 105 includes a functional block (learning unit 303 in FIG. 3) that generates/updates a learned model by performing machine learning on a learning model using teacher data. Further, the learning inference unit 105 includes a functional block (inference unit 304 in FIG. 3) that generates a high-definition image of the input image by analyzing the input image using the learned model and inferring high-frequency components. In the present embodiment, a convolutional neural network (CNN)-based super-resolution process CNN model is used as the learning model. This includes enlargement of the input image by linear interpolation, generation of a high-frequency component to be added to the enlarged image, and addition and synthesis of both.

The recording unit 106 includes a recording medium detachably connected to the image processing apparatus 100, such as a hard disk drive (HDD) or a memory card, and a recording medium control device that controls the recording medium. In accordance with a command from the control unit 101, the recording medium control device controls initialization of the recording medium, data transfer between the recording medium and the RAM 103 performed for reading and writing data, and the like.

The bus 107 is an information communication path connecting the functions of the image processing apparatus 100. The control unit 101, the ROM 102, the RAM 103, the decoding unit 104, the learning inference unit 105, and the recording unit 106 are communicably connected to each other via the bus 107.

Note that the hardware blocks described in the present embodiment and the functional blocks executed therein are not necessarily required to have the above-described configurations. For example, two or more blocks of the control unit 101, the decoding unit 104, and the learning inference unit 105 may be realized by one piece of hardware. A function of one functional block or functions of a plurality of functional blocks may be executed by cooperative operation of some pieces of hardware. Each functional block may be realized by executing a computer program deployed onto a memory by the CPU, or may be realized by dedicated hardware. A part of each functional block may exist on a cloud server, and data of a processing result may be transferred by communication.

Figure 2:
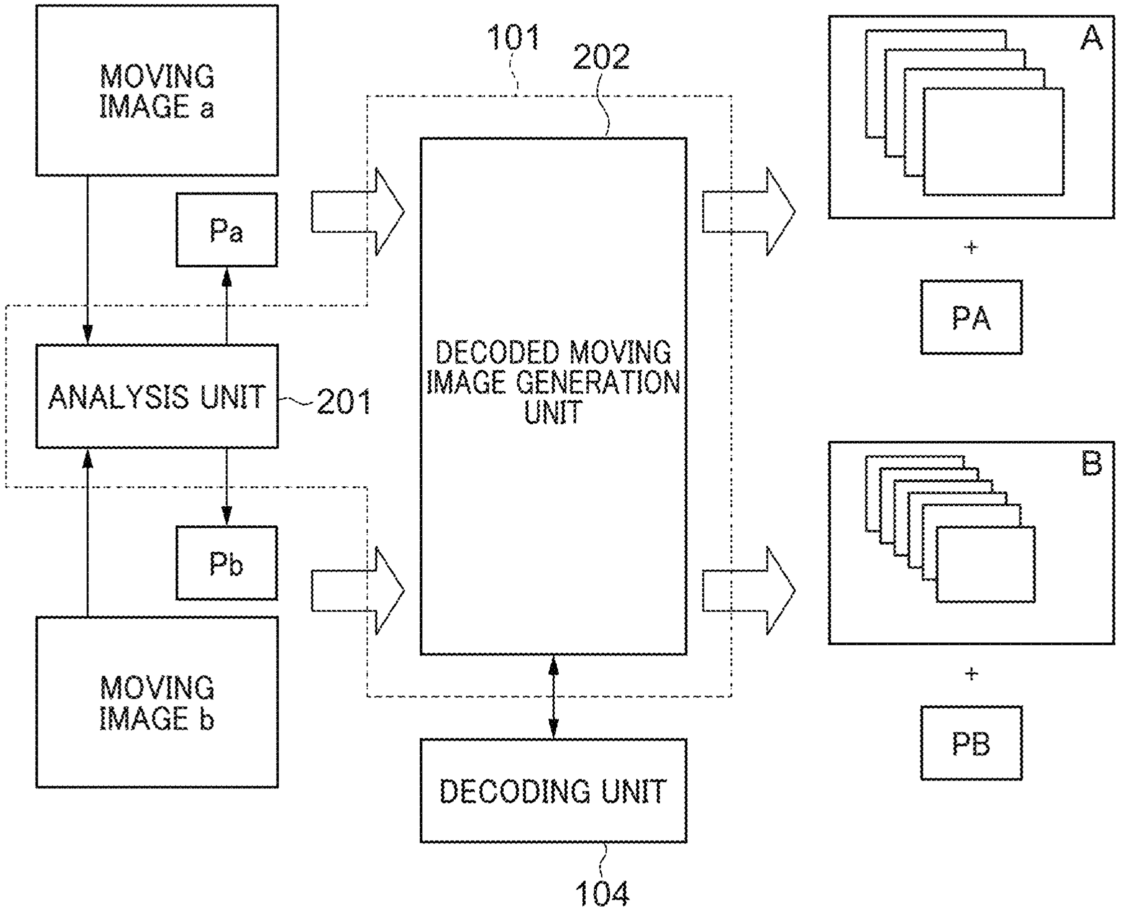
FIG. 2 is a diagram for describing functional blocks that perform decompression process of compressed moving image data by the control unit in FIG. 1.
Figure 3:
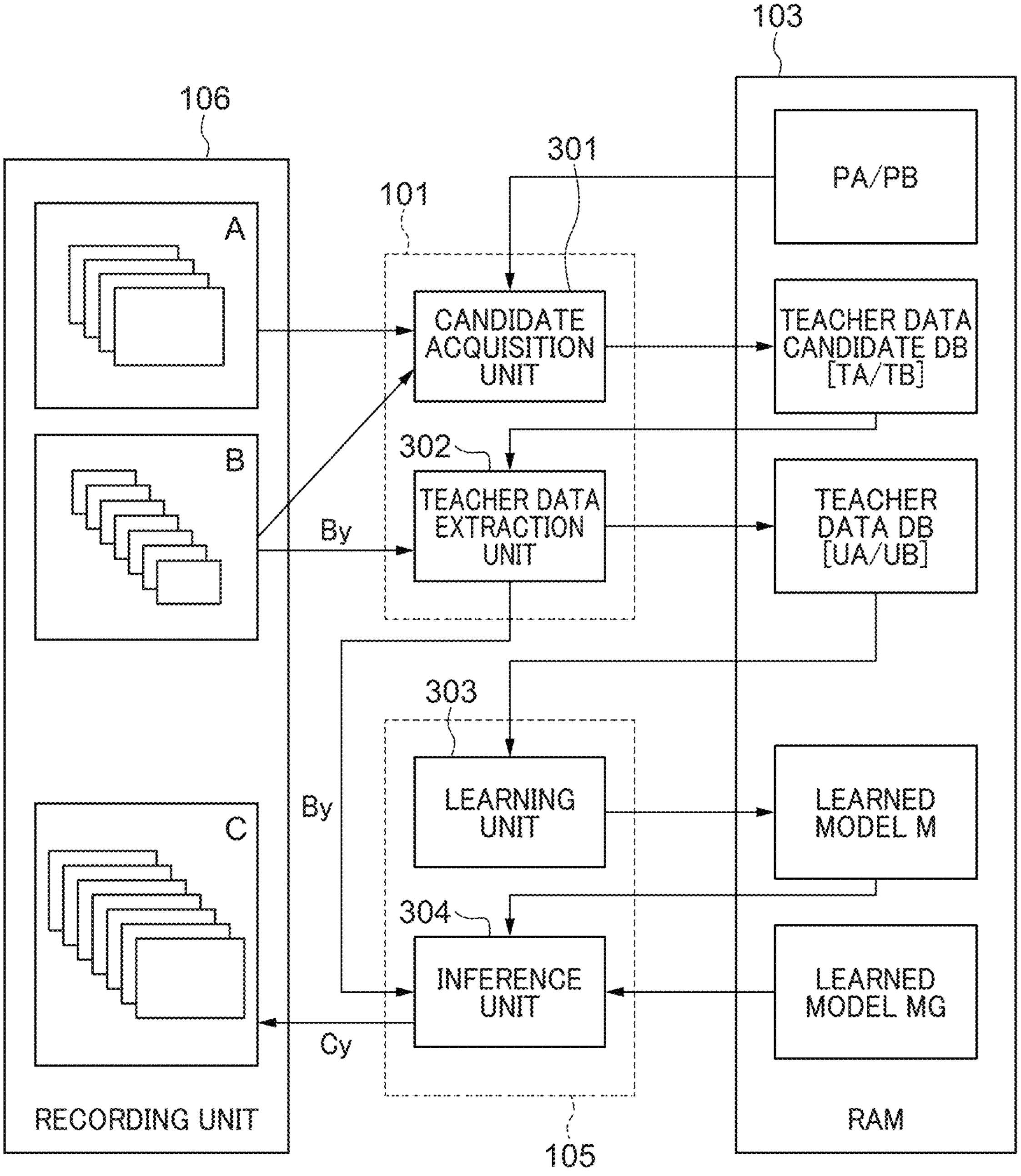
FIG. 3 is a diagram for explaining functional blocks of the teacher data candidate acquisition process performed by the control unit in FIG. 1, and functional blocks of the high-definition moving image generation process performed by the learning inference unit in FIG. 1.

Moving Image Data Recorded in Recording Medium, and Decoding/Deploying Method Thereof FIG. 2 is a diagram for describing functional blocks that perform decompression process of compressed moving image data by the control unit 101 (including the analysis unit 201 and the decoded moving image generation unit 202) in FIG. 1.

The recording unit 106 stores moving images a and b obtained by compressing the moving images A and B used in the high-definition moving image generation process. Here, the term "moving image" indicates one or more pieces of temporally continuous image data. The moving images a and b of the present embodiment are image groups simultaneously captured by an image pickup apparatus (not illustrated) having an image sensor and compressed by the MPEG method. The moving images a and b may be generated by performing thinning/reduction on images captured by a single image sensor. Alternatively, the moving images a and b may be generated by shooting the same subject with image sensors having different resolutions and frame rates.

Hereinafter, it is assumed that moving images a and b are two image groups obtained by performing different image processing on one image captured by one image sensor included in one image pickup apparatus. The moving image data of each of the moving images a and b is compressed by the MPEG method, is multiplexed with the information of the shooting time (hereinafter, simply referred to as "time information"), and is stored as an MP4 format file. The format of the file may be a format other than this as long as the image data and the corresponding time information can be acquired in a pair from the recording unit 106.

The analysis unit 201 has a function of parsing moving image data (MP4 format file in this example) of the moving images a and b recorded in the recording unit 106 and calculating storage locations in each file of contained compressed image data and time information registered as metadata. In the MP4 format, location information indicating a recording location of each frame data and time information in the file is recorded in a Moov part. The analysis unit 201 deploys and parses the Moov part of the moving image from the recording unit 106 into the RAM 103, and generates a table Pa having the frame number, the location information of the frame data, and the location information of the shooting time in the moving image a. The analysis unit 201 similarly deploys and parses the Moov part of the moving image b and generates a table Pb having the frame number, the location information of the frame data, and the location information of the shooting time in the moving image b. The tables Pa and Pb are held in the RAM 103.

For use in a high-definition moving image generation process, the moving images a and b need to be converted into an uncompressed format. As illustrated in FIG. 2, the decoded moving image generation unit 202 of the control unit 101 decodes the moving image a to generate the moving image A, decodes the moving image b to generate the moving image B, and records the generated moving images A and B in the recording unit 106. More specifically, the decoded moving image generation unit 202 sequentially inputs the frame data of the moving image a stored in the recording unit 106 to the decoding unit 104 with reference to the table Pa stored in the RAM 103, and sequentially inputs the frame data of the moving image b stored in the recording unit 106 to the decoding unit 104 with reference to the table Pb stored in the RAM 103. The decoded moving image generation unit 202 multiplexes the uncompressed frame data output from the decoding unit 104 with the time information acquired with reference to the tables Pa and Pb, and records the multiplexed data in the recording unit 106.

In this way, the moving image A is obtained by decoding the moving image a, and the moving image B is obtained by decoding the moving image b. The decoded moving image generation unit 202 also generates a table PA having the frame number, the location information of the frame data, and the location information of the shooting time in the moving image A, and records it in the RAM 103. Similarly, the decoded moving image generation unit 202 generates a table PB having the frame number, the location information of the frame data, and the location information of the shooting time in the moving image B, and records it in the RAM 103.

Figure 4:
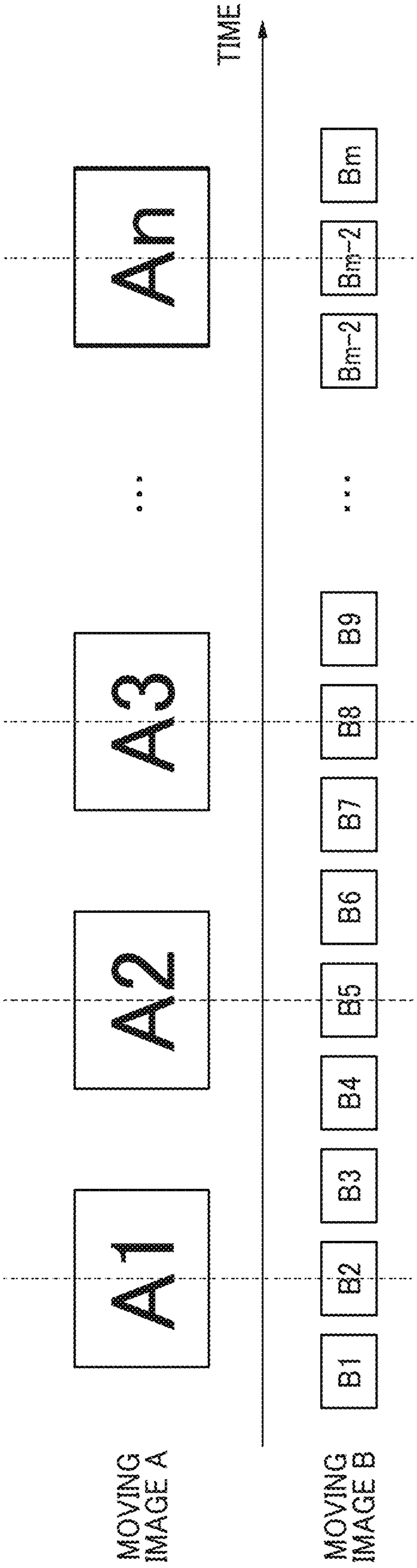
FIG. 4 is a diagram illustrating an example of a frame configuration of the input moving images according to the first embodiment.

FIG. 4 illustrates an example of a frame configuration of the moving images A and B which are input moving images according to the first embodiment. In FIG. 4, the total number of frames of the moving image A is denoted by n, and the total number of frames of the moving image B is denoted by m. Pairs of frames linked by broken lines (for example, A1 and B2, A2 and B5, A3 and B8) are pairs of frames each having the same time information or the closest time information. A link indicated by a broken line indicates that the images of a pair of frames can be assumed as being captured at the same timing.

Next, a process of generating a high-definition image according to the present embodiment will be described. This process roughly includes three processes, namely, "general-purpose learned model generation process", "teacher data candidate acquisition process", and "high-definition moving image generation process".

FIG. 3 is a diagram for explaining functional blocks of the teacher data candidate acquisition process performed by the control unit 101 in FIG. 1, and functional blocks of the high-definition moving image generation process performed by the learning inference unit 105 in FIG. 1.

As described with reference to FIG. 2, the moving images A and B are held in the recording unit 106, and the tables PA and PB are held in the RAM 103. The "general-purpose learned model generation process" is performed by the learning unit 303. The "teacher data candidate acquisition process" is performed by the candidate acquisition unit 301. The "high-definition moving image generation process" is performed by the teacher data extraction unit 302, the learning unit 303, and the inference unit 304.

The learning unit 303 of the learning inference unit 105 generates a learned model MG (second learned model), which is a general-purpose learned model, using a general-purpose teacher image group K recorded in the recording unit 106. The candidate acquisition unit 301 extracts a pair of frames as candidates for teacher data, "teacher data candidates", from a frame group (first image group) of the moving image A and a frame group (second image group) of the moving image B, and generates a teacher data candidate database (DB). A frame By, which is the image whose definition is to be enhanced, is acquired from the frame group of the image B.

In order to generate a learned model suitable for inferring a high-frequency component of the frame By, the teacher data extraction unit 302 extracts teacher data more suitable for learning from the teacher data candidates registered in the teacher data candidate DB, and generates the teacher data DB. The learning unit 303 of the learning inference unit 105 generates the learned model M (first learned model) for the frame By using the teacher data DB. The inference unit 304 inputs the frame By whose resolution is to be enhanced to the learned model M generated by the learning unit 303, and performs the definition enhancement process for the frame By. The "general-purpose learned model generation process", "teacher data candidate acquisition process", and "high-definition moving image generation process" will now be specifically described.

General-Purpose Learned Model Generation Process

In the general-purpose learned model generation process, the learning unit 303 of the learning inference unit 105 generates the learned model MG. An image group collected so that it contains equally diverse image patterns is recorded in the recording unit 106 in advance. This image group is referred to as a general-purpose teacher image group K (not illustrated).

Figure 8:
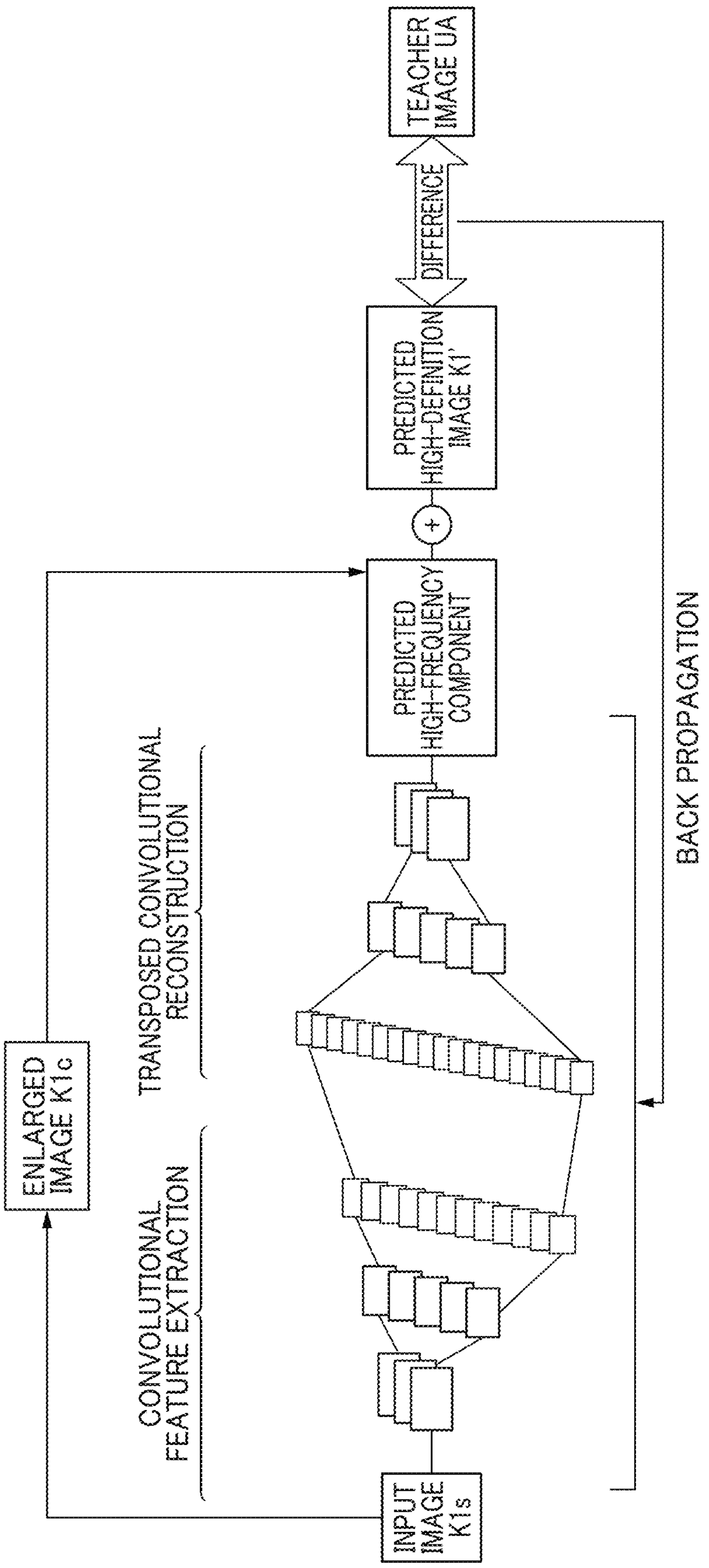
FIG. 8 is a diagram schematically illustrating a learned model generation function of the learning unit in FIG. 3.

FIG. 8 is a diagram schematically illustrating a learned model generation function of the learning unit 303 (learning unit) in FIG. 3. The learned model generation function includes a learning step and an inference step, and the inference step may include a feature extraction step and a reconstruction step that use a filter including a CNN.

First, in the feature extraction step, the learning unit 303 randomly extracts one image from the image group K (referred to as an image K1), and reduces the image K1 by a bicubic method or the like to generate a reduced image K1*s*. The generated image K1*s* is input to the CNN, and convolutional feature extraction is performed to generate a large number of feature maps by the CNN.

Next, in the reconstruction step, the learning unit 303 performs transposed convolutional reconstruction in which all the feature maps are up-sampled by deconvolution to generate predicted high-frequency components. In the reconstruction step, the learning unit 303 further reconstructs the image by adding an enlarged image K1*c* obtained by enlarging the image K1*s* by the bicubic method or the like with the predicted high-frequency components to generate a predicted high-definition image K1'. In the learning step, the learning unit 303 compares the predicted high-definition image K1' generated in the inference step described above with the image K1 (teacher image), and fine-tunes the learned model MG by back propagation using the difference therebetween. The learning unit 303 repeats the learning of the CNN using the image K1 randomly extracted from the image group K a predetermined number of times as described above, thereby constructing the learned model MG capable of exhibiting a constant inference accuracy for images of various patterns. The learning unit 303 stores the learned model MG generated by the learned model generation function in the RAM 103.

Teacher Data Candidate Acquisition Process

In the teacher data candidate acquisition process, the control unit 101 (candidate acquisition unit 301) generates the teacher data candidate DB. In the first embodiment, the candidate acquisition unit 301 acquires a pair of a moving image A frame and a moving image B frame having shot at the same time among the frames of the moving images A and B as teacher data candidates. Specifically, all of the pairs of frames (pairs of frames linked by broken lines in FIG. 4) that have a common shooting time between the moving images A and B are acquired as teacher data candidates. Before the learning process described later is performed, the candidate acquisition unit 301 examines which frames can be used as teacher data, constructs the teacher data candidate DB, and registers a result of the examination.

FIG. 6 illustrates an example of a data configuration of the teacher data candidate DB. In the teacher data candidate DB, frame numbers in the respective moving image files of a frame group TA that can be used as teacher data in the moving image A and a frame group TB that can be used as teacher data in the moving image B are registered. Here, each pair of frames (pair of frame numbers) having the same shooting time is registered in association with a unique index I in the teacher data candidate DB. For example, in the moving images A and B illustrated in FIG. 4, the frame pairs A1 and B2, A2 and B5, and A3 and B8 (hereinafter omitted)

are the frame combinations captured at the same time. The teacher data candidate DB illustrated in FIG. 6 illustrates a state in which these pairs are recorded using frame numbers and assigned with unique indices I. The acquired teacher data candidates are managed by the teacher data candidate DB in this manner.

Figure 5:
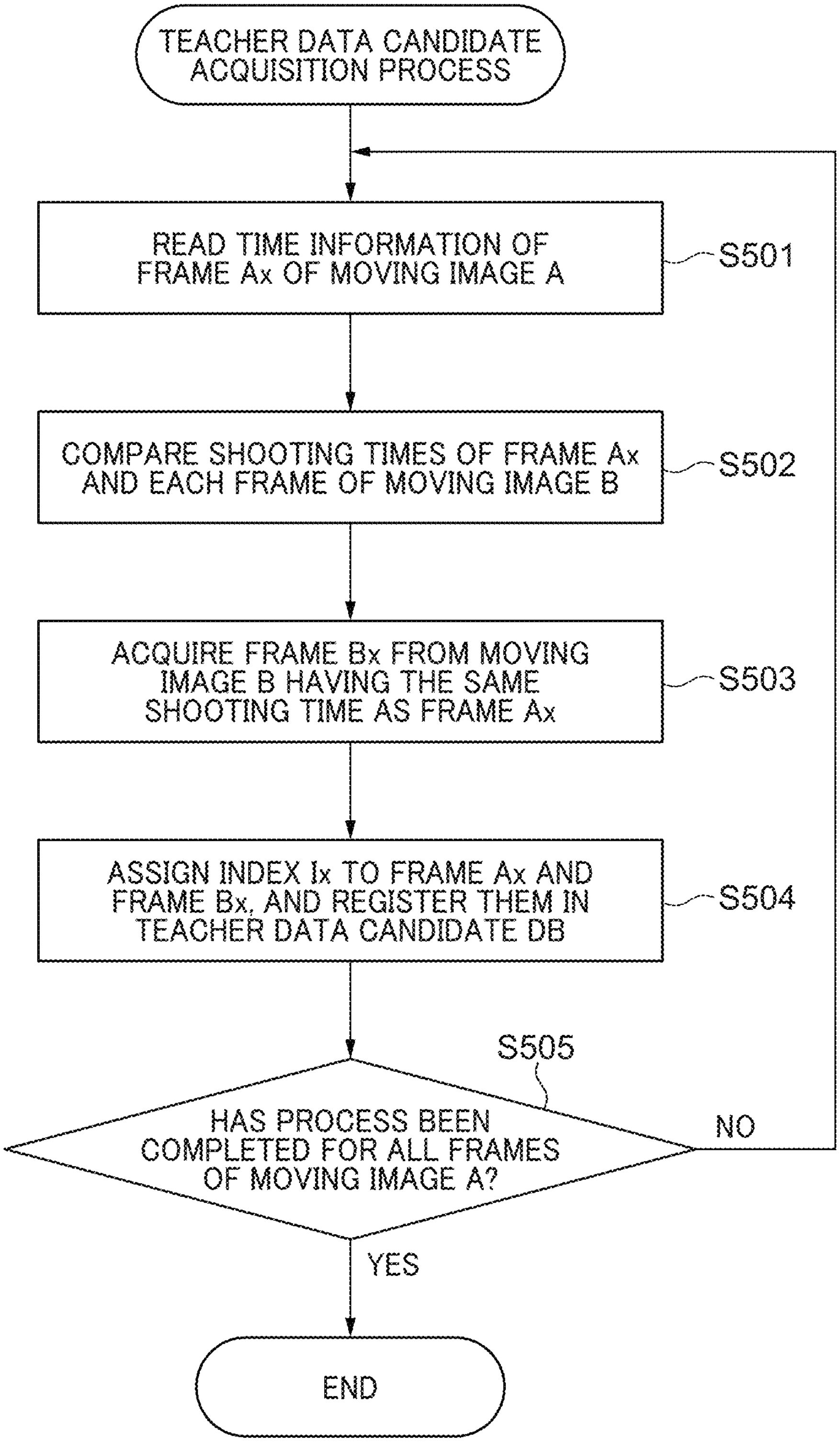
FIG. 5 is a flowchart of the teacher data candidate acquisition process according to the first embodiment.

Details of the teacher data candidate acquisition process described above will be described with reference to the flowchart of FIG. 5.

In step S501, the candidate acquisition unit 301 selects one frame of the moving image A and acquires time information corresponding to the selected frame from the table PA. In the present embodiment, frames are selected in order from the head of the moving image A recorded in the recording unit 106. More specifically, the candidate acquisition unit 301 selects one frame at a time in order from the head of the moving image A recorded in the recording unit 106. Hereinafter, the selected frame is referred to as a "frame Ax". The candidate acquisition unit 301 reads the time information corresponding to the frame Ax from the recording unit 106 by referring to the table PA recorded in the RAM 103, and transfers the read time information to the RAM 103.

In step S502, the candidate acquisition unit 301 compares the time information of the frame Ax read in step S501 with the time information of each frame of the moving image B. That is, the shooting time of the frame Ax that has been read out is compared with the shooting time of each frame of the moving image B. Specifically, the candidate acquisition unit 301 sequentially acquires the time information of each frame of the moving image B from the recording unit 106 with reference to the table PB, and compares the time information with the time information of the frame Ax.

In step S503, the candidate acquisition unit 301 acquires a frame of the moving image B having a shooting time that coincides with the shooting time of the frame Ax, and sets the acquired frame as a "frame Bx".

In step S504, the candidate acquisition unit 301 gives in the teacher data candidate DB a unique index Ix to the combination of the frames Ax and Bx, and registers them in the teacher data candidate DB. Specifically, the candidate acquisition unit 301 issues the index Ix unique to the combination of the frames Ax and Bx, and registers the index Ix, the frame number of the frame Ax in the moving image A, and the frame number of the frame Bx in the moving image B in the teacher data candidate DB.

In step S505, the candidate acquisition unit 301 determines whether the process of steps S501 to S504 described above has been completed for all the frames of the moving image A. When the candidate acquisition unit 301 determines that the process of S501 to S504 has been completed (YES in step S505), this process ends. On the other hand, when the candidate acquisition unit 301 determines that the process of S501 to S504 is not completed (NO in step S505), the process returns to step S501, and the process of S501 to S504 described above is executed for the next frame of the moving image A.

The teacher data candidate DB is generated by this teacher data candidate acquisition process.

It should be noted that, although the frame pairs to be registered in the teacher data candidate DB are determined by comparing the shooting times in step S502 in the present embodiment, the present invention is not limited thereto. For example, the image of the frame Ax may be reduced so that its resolution becomes the resolution XB. An indicator representing the similarity between the image of the frame Ax having the resolution XB and the image of each frame of the moving image B may be used to determine their similarity, and the frame pairs to be registered in the teacher data candidate DB may be selected using the determination results. In this case, the candidate acquisition unit 301 may have a similarity determination function for comparing two or more pieces of image data to determine their similarity. It should be noted that, for example, a Structural Similarity Index (SSIM) can be used as the indicator of the similarity between images. In addition, in the acquisition of the indicator of similarity, the image of the frame Ax is reduced so that its resolution becomes the resolution XB, but the present invention is not limited thereto. The image of the frame Ax may not be reduced, and the resolution of the image after reduction may be different from the resolution XB.

High-Definition Moving Image Generation Process

Next, the high-definition moving image generation process performed by the control unit 101 (teacher data extraction unit 302) and the learning inference unit 105 (learning unit 303 and inference unit 304) will be described.

First, an outline of the high-definition moving image generation process will be given with reference to FIG. 3. (Details will be described later with reference to FIG. 7).

The teacher data extraction unit 302 selects teacher data suitable for training the "learned model for the frame By to be inferred" from the teacher data candidate DB and generates the teacher data DB. When the teacher data pairs registered in the generated teacher data DB satisfies a predetermined registration number, the learning unit 303 generates the learned model M using the extracted teacher data. Then, the inference unit 304 uses the learned model M to infer high-frequency components of the frame By to be inferred, and performs the definition enhancement process to obtain a frame (image) Cy that is the frame By to be inferred with enhanced definition.

However, in a case where the teacher data pairs registered in the generated teacher data DB do not satisfy the predetermined registration number, the subsequent learning process is not executed, and the high-frequency component of the frame By to be inferred is inferred using the learned model MG generated in advance and stored in the RAM 103, thereby obtaining the frame Cy. Note that the control unit 101 generates the moving image C on the recording unit 106 before starting the high-definition moving image generation process. At the start of the high-definition moving image generation process, the moving image C has no frame data and is empty. The inference unit 304 sequentially records the generated frames Cy in the moving image C.

The above-described high-definition moving image generation process will be described more specifically with reference to the flowchart of FIG. 7.

In step S701, the teacher data extraction unit 302 reads one frame from the moving image B as a frame whose definition is to be enhanced. Hereinafter, the frame read in step S701 is referred to as the "frame By". In the present embodiment, the teacher data extraction unit 302 sequentially reads one frame at a time from the head of the moving image B recorded in the recording unit 106. More specifically, the teacher data extraction unit 302 refers to the table PB, reads the frame data and time information of the frame By from the recording unit 106, and transfers the frame data and time information to the RAM 103.

In step S702, the teacher data extraction unit 302 (collection unit) first extracts, from the teacher data candidates (frame group TB) registered in the teacher data candidate DB, a frame having a shooting time whose difference from that of the frame By is shorter than a threshold determined in advance in the system. Next, the teacher data extraction unit 302 registers the extracted frame in the teacher data DB. The threshold may be, for example, a display period of one frame of the moving image A (period for which one frame is displayed at the frame rate XA). The structure of the teacher data DB is similar to that of the teacher data candidate DB (FIG. 6).

Specifically, first, the teacher data extraction unit 302 refers to the location information of the table PB to acquire the time information of each of the frames included in the frame group TB registered in the teacher data candidate DB. The teacher data extraction unit 302 compares each of the shooting times indicated by the acquired time information with the shooting time of the frame By. Then, the teacher data extraction unit 302 extracts, from the frame group TB, a frame having a shooting time (time information) whose difference from the shooting time of the frame By is shorter than the threshold, and registers the frame in the teacher data DB on the RAM 103. Hereinafter, the frame group of the moving image B registered in the teacher data DB by this process is referred to as a "frame group UB".

In the present embodiment, to construct the teacher data DB, a group of frames having a shooting time whose difference from the shooting time of the frame By is smaller than the threshold is extracted from the teacher data candidate DB, but the present invention is not limited thereto. The frame group UB may be extracted using an indicator of the similarity with the frame By. For example, the teacher data extraction unit 302 may use the SSIM to extract, from the frame group TB, a group of frames having an indicator representing the similarity with the frame By that is higher than a threshold defined in advance in the system, and register the extracted group of frames as the frame group UB.

In step S703, the teacher data extraction unit 302 registers in the teacher data DB the frames of the frame group TA paired with the frames of the frame group UB in the teacher data candidate DB. Specifically, the teacher data extraction unit 302 refers to the teacher data candidate DB on the RAM 103, and registers a frame of the frame group TA associated with one of the frames of the frame group UB by the index I in the teacher data DB. At this time, a unique index J is assigned to each combination in the teacher data DB without changing the combination of the two associated frames. Hereinafter, the frame group of the moving image A registered in the teacher data DB is referred to as a "frame group UA".

In step S704, the control unit 101 (first selection unit, second selection unit) determines whether or not the number of teacher data pairs registered in the teacher data DB (that is, the number of images of the frame group UA) exceeds a predetermined numerical value. When the control unit 101 determines that the number of teacher data pairs registered in the teacher data DB exceeds the predetermined numerical value (YES in step S704), it is determined that the frame group UA is suitable as a teacher image group, and the process proceeds to step S705. On the other hand, when the control unit 101 determines that the number of teacher data pairs registered in the teacher data DB does not exceed the predetermined numerical value (NO in step S704), it is determined that the frame group UA is not suitable as a teacher image group, and the process proceeds to step S709.

In step S705, through the learned model generation function as illustrated in FIG. 8, the learning unit 303 performs learning using the teacher data (the frame groups UA and UB) registered in the teacher data DB to generate the learned model M. The content of the generation process is similar to the description in the general-purpose learned model generation process, and thus will be omitted. The generated learned model M is recorded in the RAM 103.

As described above, the learning unit 303 refers to the teacher data DB and the tables PA and PB, reads the frame data of the frame pair registered as the teacher data from the recording unit 106, and inputs the frame data to the learned model generation function described above. The learning unit 303 stores the learned model M generated by the learned model generation function in the RAM 103.

In step S706, the inference unit 304 generates the high-definition frame Cy from the frame By by inference using the learned model M generated in step S705. Specifically, first, the inference unit 304 reads the learned model M stored in the RAM 103. Next, the inference unit 304 inputs the frame data (image) of the frame By held in the RAM 103 in step S701 to the learned model M. As a result, the inference unit 304 acquires the "high-frequency component the image of the frame By is expected to have when it is enlarged so as to have the resolution XA", which is the inference result output from the learned model M. The inference unit 304 generates an image of the high-definition frame Cy having the resolution XA by adding the acquired high-frequency component to an "image obtained by linearly enlarging the image of the frame By so as to have the resolution XA", and records the generated image of the high-definition frame Cy in the RAM 103. It should be noted that the process performed on the frame By from the inference of the high-frequency component to the generation of the high-definition image is similar to the inference process described above with reference to FIG. 8. Thereafter, the process proceeds to step S707.

On the other hand, in step S709, the inference unit 304 generates the high-definition frame Cy from the frame By by inference using the learned model MG generated in the general-purpose learned model generation process. Specifically, first, the inference unit 304 reads the learned model MG stored in the RAM 103. Next, the inference unit 304 inputs the frame data (image) of the frame By held in the RAM 103 in step S701 to the learned model MG. As a result, the inference unit 304 acquires the "high-frequency component the image of the frame By is expected to have when it is enlarged so as to have the resolution XA", which is the inference result output from the learned model MG. The inference unit 304 generates an image of the high-definition frame Cy having the resolution XA by adding the acquired high-frequency component to an "image obtained by linearly enlarging the image of the frame By so as to have the resolution XA", and records the generated image of the high-definition frame Cy in the RAM 103. It should be noted that the process performed on the frame By from the inference of the high-frequency component to the generation of the high-definition image is similar to the inference process described above with reference to FIG. 8. Thereafter, the process proceeds to step S707.

In step S707, the inference unit 304 adds the frame data of the high-definition frame Cy recorded in the RAM 103 to the end of the high-definition moving image C on the recording unit 106. Further, the time information of the frame By is duplicated, multiplexed as the shooting time of the high-definition frame Cy, and recorded in the moving image C.

In step S708, the control unit 101 determines whether or not the process of steps S701 to S707 and S709 described above has been completed for all the frames of the moving image B. When control unit 101 determines that the process of S701 to S707 and S709 is not completed (NO in step S708), the process returns to step S701 in which the subsequent frame in the moving image B is selected by the teacher data extraction unit 302 as the frame By, and the process of S701 to S707 and S709 is repeated. On the other hand, when the control unit 101 determines that the process of S701 to S707 and S709 has been completed (YES in step S708), this process ends.

As described above, when the high-definition moving image generation process ends, the high-definition moving image C with the resolution XA and the frame rate FB is recorded in an uncompressed format in the recording unit 106.

It should be noted that, in the above description, it has been described that each functional block is realized by only the control unit 101 or only the learning inference unit 105, but the present invention is not limited thereto. For example, each functional block may be realized by cooperation of the control unit 101 and the learning inference unit 105. For example, the function of the inference unit 304 may be realized by the control unit 101 and the learning inference unit 105, and the process of recording the high-definition frame Cy and the shooting time in the moving image C stored in the recording unit 106 may be executed by the control unit 101.

In the present embodiment, the teacher data candidate acquisition process is performed before the learning process of the entire moving image and the high-definition moving image generation process are performed, but instead the teacher data candidate acquisition process may be performed in parallel with the high-definition moving image generation process. Although the learned model M is newly generated for each frame to be inferred and the previously-generated model is discarded in step S705 in the present embodiment, the present invention is not limited thereto. For example, a learned model M' trained externally in advance may be loaded, and additional training using the frame groups UA and UB may be performed on the loaded learned model M' in step S705. When the learned model M is newly generated in the present embodiment, the initial value (learning model) of the learned model MG may be used as the learned model MG. This reduces the learning time.

As described above, according to the first embodiment, since the learned model M trained by an image group close to the image whose definition is to be enhanced is used among the image groups shot in the same shooting period, the definition of the image can be enhanced with high accuracy. In addition, since pairs of images from the two image groups that are each shot at the same time are used as teacher data, learning with higher accuracy can be performed.

Furthermore, according to the first embodiment, when the number of teacher data pairs registered in the teacher data DB does not exceed the predetermined numerical value (NO in step S704), it is determined that the frame group UA is not suitable as a teacher image group. In this case, since inference using the learned model MG is performed without generating the learned model M, it is possible to execute a super-resolution process of an image to be inferred using at a constant inference accuracy without reducing processing efficiency of the learning process.

A second embodiment of the present invention will be described. In the first embodiment, whether or not to generate the learned model M by learning using teacher data pairs (step S704 in FIG. 7) is determined based on "whether or not the number of teacher data pairs registered in the teacher data DB exceeds a predetermined numerical value". Meanwhile, in the second embodiment, whether or not to generate the learned model M by learning using teacher data pairs is determined based on "whether an average value similarity between the frame By and each of the teacher data pairs registered in the teacher data DB exceeds a predetermined numerical value".

That is, the second embodiment is different from the first embodiment in the content of the high-definition moving image generation process. The basic hardware configuration and software configuration of the image processing apparatus according to the second embodiment are similar to those of the first embodiment. The same reference numerals are given to the same configurations and steps as those of the first embodiment, and redundant description will be omitted.

A high-definition moving image generation process (FIG. 9) that is a difference of the second embodiment from the first embodiment will be described.

High-Definition Moving Image Generation Process

Figure 9:
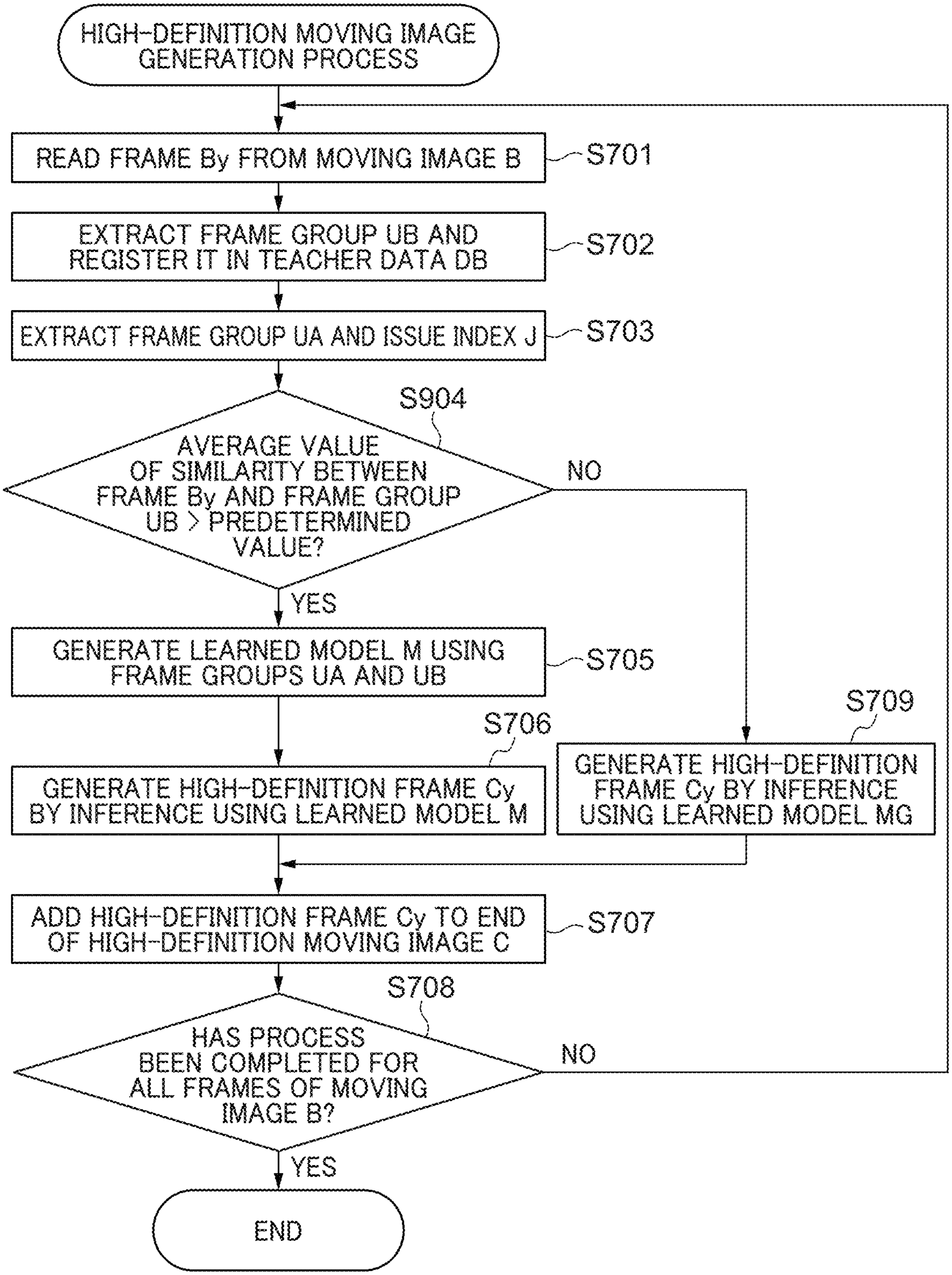
FIG. 9 is a flowchart of the high-definition moving image generation process according to a second embodiment.

FIG. 9 is a flowchart of the high-definition moving image generation process according to the second embodiment.

Figure 7:
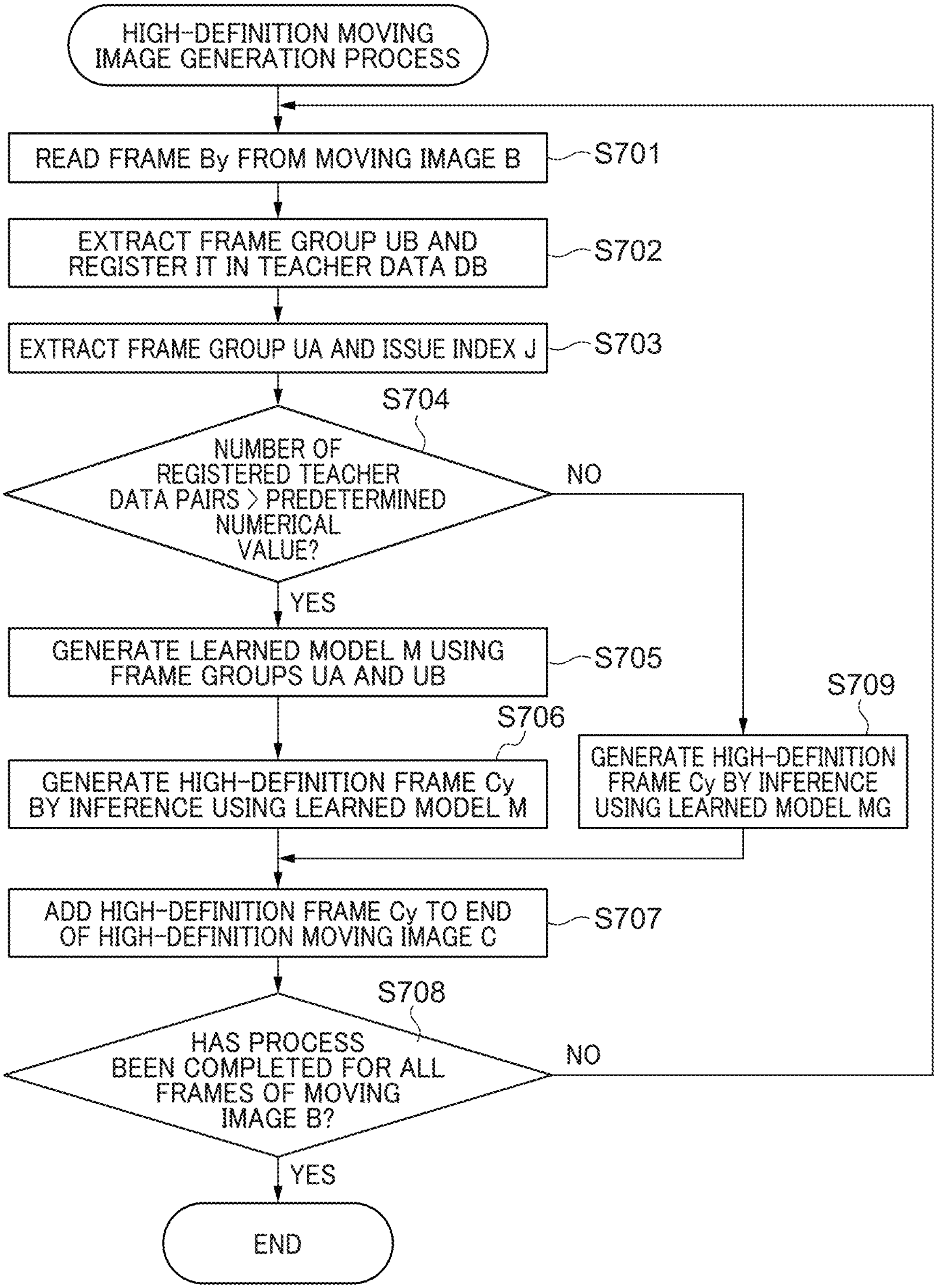
FIG. 7 is a flowchart of the high-definition moving image generation process according to the first embodiment.

The process of FIG. 9 is the same as the process of FIG. 7 except that step S904 is executed instead of step S704 of FIG. 7. Therefore, only the process of step S904 will be described here.

In step S904, the control unit 101 sequentially reads the frames of the frame group UB registered in the teacher data DB, and executes calculates their similarity with the frame By read in step S701 using the SSIM. Next, the average value of the similarities calculated for all the frames of the frame group UB is calculated, and it is determined whether the calculated average value exceeds a predetermined value. When the control unit 101 determines that the calculated average value exceeds the predetermined value (YES in step S904), the process proceeds to step S705. On the other hand, when the control unit 101 determines that the calculated average value does not exceed the predetermined value (NO in step S904), the process proceeds to step S709.

As described above, according to the second embodiment, for example, in a case where the frame By is a frame at the moment a camera flashed, the similarity between the frame By and the frame group UB is low, and the average value calculated in step S904 does not exceed the predetermined value (NO in step S904). In such a case, even if the number of teacher data pairs registered in the teacher data DB exceeds a predetermined numerical value (see YES in step S704), the generation of the learned model M by learning using the teacher data pairs is not performed, and the inference using the learned model MG is executed. This allows the super-resolution process for the image to be inferred to be executed at a constant inference accuracy without reducing the processing efficiency of the learning process.

A third embodiment of the present invention will be described. In the first embodiment, when the generation of the learned model M by learning using the teacher data pairs is not performed (NO in step S704 in FIG. 7), the high-definition frame Cy is generated using the learned model MG generated in advance by the general-purpose learned model generation process. On the other hand, in the third embodiment, in the general-purpose learned model generation process, two learned models MG1 (third learned model) and MG2 (fourth learned model) trained using different teacher image groups are generated in advance. Thereafter, if the learned model M is not generated by learning using the frame groups UA and UB (teacher data pairs), a model more suitable as the model for inferring the high-definition frame Cy from the frame By is selected from the learned models MG1 and MG2.

That is, the third embodiment is different from the first embodiment in the content of the general-purpose learned model generation process and the high-definition moving image generation process. The basic hardware configuration and software configuration of the image processing apparatus according to the third embodiment are similar to those of the first embodiment. The same reference numerals are given to the same configurations and steps as those of the first embodiment, and redundant description will be omitted.

The general-purpose learned model generation process and the high-definition moving image generation process (FIG. 10) that are differences of the third embodiment from the first embodiment will be described.

General-Purpose Learned Model Generation Process

In the general-purpose learned model generation process according to the third embodiment, the learning unit 303 of the learning inference unit 105 generates the general-purpose learned models MG1 and MG2. Two image groups collected so that they contain different image patterns are recorded in the recording unit 106. These image groups are referred to as general-purpose teacher image groups K1 and K2. The learning unit 303 constructs the learned model MG1 by learning using the general-purpose teacher image group K1 (one of the two different image groups) as teacher images by the learned model generation function (FIG. 8). Similarly, the learning unit 303 constructs the learned model MG2 by learning using the general-purpose teacher image group K2 (the other of the two different image groups) as teacher images. Thereafter, the learning unit 303 stores the learned model MG1 in the RAM 103 together with additional information associated with the location information on the recording unit 106 of the general-purpose teacher image group K1 used for the learning. Similarly, the learning unit 303 stores the learned model MG2 in the RAM 103 together with additional information associated with the location information on the recording unit 106 of the general-purpose teacher image group K2 used for the learning.

High-Definition Moving Image Generation Process

Figure 10:
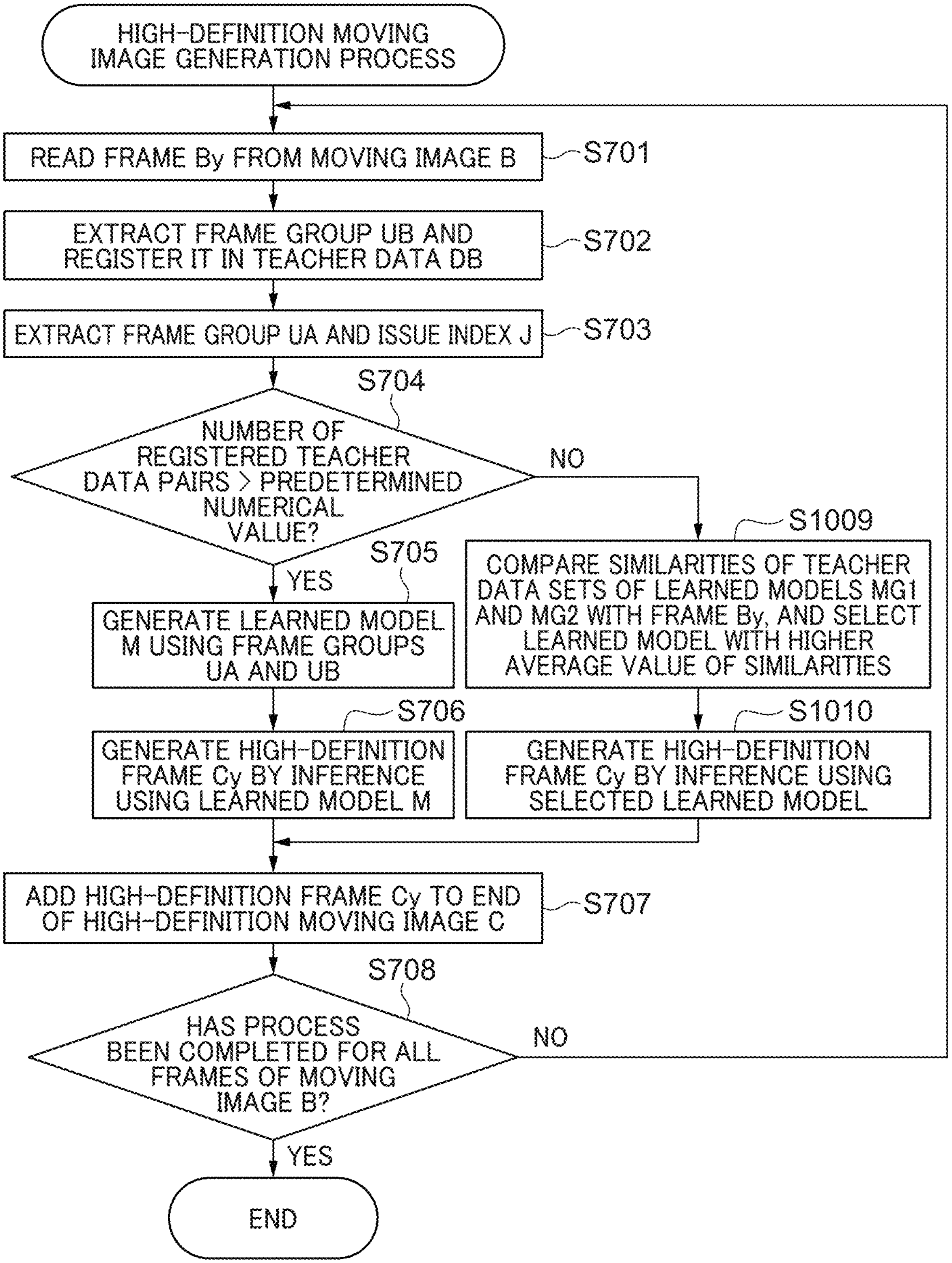
FIG. 10 is a flowchart of the high-definition moving image generation process according to a third embodiment.

FIG. 10 is a flowchart of the high-definition moving image generation process according to the third embodiment.

The process of FIG. 10 is the same as the process of FIG. 7 except that steps S1009 and S1010 are executed instead of step S709. Therefore, only the process of steps S1009 and S1010 will be described here.

In step S1009, the control unit 101 first refers to the additional information recorded in the RAM 103 together with the learned model MG1, and acquires the location on the recording unit 106 of the general-purpose teacher image group K1 associated with the learned model MG1. The control unit 101 reads the images belonging to the general-purpose teacher image group K1 one by one into the RAM 103, and calculates the similarity with the frame By on the RAM 103 using the SSIM. After the calculation of the similarity for all the images of the general-purpose teacher image group K1 is completed, an average value Av1 thereof is calculated and held in the RAM 103. The control unit 101 also executes a similar process for the general-purpose teacher image group K2 associated with the learned model MG2, and acquires an average value Av2 of the similarity between each image belonging to the general-purpose teacher image group K2 and the frame By. Thereafter, the control unit 101 compares the average value Av1 with the average value Av2, and selects the one of the learned models MG1 and MG2 having the higher average value.

In step S1010, the inference unit 304 generates the high-definition frame Cy from the frame By by inference using the learned model MG selected in step S1009.

As described above, according to the third embodiment, when the generation of the learned model M is not performed (NO in step S704), the model trained using the teacher data having a higher similarity to the frame By, which is the frame whose definition is to be enhanced, is selected from the learned models MG1 and MG2. Thereafter, the high-definition frame Cy is generated from the frame By by inference using the selected model.

The learned model MG used in the first embodiment is a model generated in advance using teacher data collected at the time the content of the frame By is unknown. Therefore, a wide variety of images containing equally diverse image patterns are used as the teacher data, and there are only few pieces of teacher data having a high similarity with the frame By. It cannot be said that the inference accuracy of the learned model MG is high. On the other hand, the learned models MG1 and MG2 used in the third embodiment are similar to the learned model MG in the first embodiment in that they are models generated in advance using teacher data collected at the time the content of the frame By is unknown. However, unlike the first embodiment, in the third embodiment, between the learned models MG1 and MG2, the model generated using teacher data having a higher similarity to the frame By is selected in step S1009. Therefore, it can be expected that the inference result of the high-definition frame Cy obtained in step S1010 of the third embodiment is more accurate than the result obtained in step S709 of the first embodiment.

It should be noted that the configuration of the third embodiment can also be applied to the second embodiment.

It should be noted that the present embodiment can also be implemented by a process in which a program for implementing one or more functions is supplied to a computer of a system or an apparatus via a network or a storage medium, and a system control unit of the system or apparatus reads and executes the program. The system control unit may have one or more processors or circuits, and may include a plurality of isolated system control units or a network of a plurality of isolated processors or circuits to read and execute executable instructions.

The processor or circuit may include a central processing unit (CPU), a micro processing unit (MPU), a graphics processing unit (GPU), an application specific integrated circuit (ASIC), a field programmable gate array (FPGA), a digital signal processor (DSP), a data flow processor (DFP), or a neural processing unit (NPU).

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-163092, filed Sep. 26, 2023, which is hereby incorporated by reference wherein in its entirety.

What is claimed is:

1. An image processing apparatus that enhances a definition of a second image group (B) having a frame rate FB and a resolution XB to a resolution XA (>XB) of a first image group (A) having a frame rate FA (<FB) by inference using a learned model, the first and second image groups (A and B) being frame groups of two moving images (A and B) respectively generated by simultaneously shooting the same subject with different resolutions and frame rates, the image processing apparatus comprising:

one or more controllers configured to function as:

a learning unit (303) that trains a learning model by using a teacher image group having the resolution XA to generate the learned model;

a collection unit (302) that collects an image group (UA) from the first image group (TA) based on an image (By) whose definition is to be enhanced every time the image whose definition is to be enhanced is acquired from the second image group (B);

a first selection unit that, when it is determined that the collected image group (UA) is suitable as the teacher image group (YES in S704), generates a first learned model (M) by the learning unit using the collected image group (UA) as the teacher image group, and selects the generated first learned model (M) as the learned model; and a second selection unit that, when it is determined that the collected image group (UA) is not suitable as the teacher image group (NO in S704), selects, as the learned model, a second learned model (MG) generated in advance by the learning unit using a previously-collected image group (K) as the teacher image group.

2. The image processing apparatus according to claim 1, wherein when the number of images (registration number in a DB) of the collected image group (UA) exceeds a predetermined numerical value (S704), it is determined that the collected image group (UA) is suitable as the teacher image group.

3. The image processing apparatus according to claim 2, wherein the collected image group (UA) is a frame group collected from the first image group (TA) and whose difference in shooting time from the image whose definition is to be enhanced is smaller than a threshold.

4. The image processing apparatus according to claim 2, wherein a frame group (UB) having a similarity to the image whose definition is to be enhanced higher than a threshold is extracted from a frame group (TB) in the second image group (B) assumed to be shot at the same timing as the first image group (TA); and an image group of the first image group (TA) assumed to be shot at the same timing as the extracted frame group (UB) is used as the collected image group (UA).

5. The image processing apparatus according to claim 1, wherein when an average value of similarity between a frame group (UB) in the second image group (B) assumed to be shot at the same timing as the collected image group (UA) and the image (By) whose definition is to be enhanced exceeds a predetermined value (S904), the collected image group (UA) is determined to be suitable as the teacher image group.

6. The image processing apparatus according to claim 1, wherein the learning unit uses the second learned model (MG) as an initial value when generating the first learned model (M).

7. The image processing apparatus according to claim 1, wherein two different image groups are included in the previously-collected image group (K), the learning unit generates a third learned model (MG1) using one of the two different image groups as the teacher image group, and generates a fourth learned model (MG2) using the other of the two different image groups as the teacher image group, selects the third learned model (MG1) as the second learned model (MG) when an average value of similarity to the image whose definition is to be enhanced is higher in the one of the two different image groups than in the other, and selects the fourth learned model (MG2) as the second learned model (MG) when an average value of similarity to the image whose definition is to be enhanced is higher in the other of the two different image groups than in the one.

8. A control method of an image processing apparatus that enhances a definition of a second image group having a frame rate FB and a resolution XB to a resolution XA (>XB) of a first image group having a frame rate FA (<FB) by inference using a learned model, the first and second image groups being frame groups of two moving images respectively generated by simultaneously shooting the same subject with different resolutions and frame rates, the control method comprising:

a learning step of training a learning model by using a teacher image group having the resolution XA to generate the learned model;

a collection step of collecting an image group from the first image group based on an image whose definition is to be enhanced every time the image whose definition is to be enhanced is acquired from the second image group;

a first selection step of, when it is determined that the collected image group is suitable as the teacher image group, generating a first learned model in the learning step using the collected image group as the teacher image group, and selecting the generated first learned model as the learned model; and a second selection step of, when it is determined that the collected image group is not suitable as the teacher image group, selecting, as the learned model, a second learned model generated in advance in the learning step by using a previously-collected image group as the teacher image group.

9. A non-transitory storage medium storing a computer-executable program for causing a computer to execute a control method of an image processing apparatus that enhances a definition of a second image group having a frame rate FB and a resolution XB to a resolution XA (>XB) of a first image group having a frame rate FA (<FB) by inference using a learned model, the first and second image groups being frame groups of two moving images respectively generated by simultaneously shooting the same subject with different resolutions and frame rates, the control method comprising:

a learning step of training a learning model by using a teacher image group having the resolution XA to generate the learned model;

a collection step of collecting an image group from the first image group based on an image whose definition is to be enhanced every time the image whose definition is to be enhanced is acquired from the second image group;

a first selection step of, when it is determined that the collected image group is suitable as the teacher image group, generating a first learned model in the learning step using the collected image group as the teacher image group, and selecting the generated first learned model as the learned model; and a second selection step of, when it is determined that the collected image group is not suitable as the teacher image group, selecting, as the learned model, a second learned model generated in advance in the learning step by using a previously-collected image group as the teacher image group.

* * * * *